US012569933B2

(12) United States Patent
Han et al.

(10) Patent No.: US 12,569,933 B2
(45) Date of Patent: Mar. 10, 2026

---

(54) LASER STITCH WELDING DEVICE AND WELDING METHOD THEREFOR

(71) Applicant: CRRC QINGDAO SIFANG CO., LTD., Qingdao (CN)

(72) Inventors: Xiaohui Han, Qingdao (CN); Guolong Ma, Qingdao (CN); Zhiyi Zhang, Qingdao (CN); Zhendong Mao, Qingdao (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 989 days.

(21) Appl. No.: 17/630,148

(22) PCT Filed: Jun. 24, 2020

(86) PCT No.: PCT/CN2020/097922
§ 371 (c)(1),
(2) Date: Jan. 25, 2022

(87) PCT Pub. No.: WO2021/031691
PCT Pub. Date: Feb. 25, 2021

(65) Prior Publication Data
US 2022/0274201 A1 Sep. 1, 2022

(30) Foreign Application Priority Data
Aug. 21, 2019 (CN) .......................... 201910772401.1

(51) Int. Cl.
*B23K 26/24* (2014.01)
*B23K 26/03* (2006.01)
(Continued)

(52) U.S. Cl.
CPC ............ *B23K 26/24* (2013.01); *B23K 26/034* (2013.01); *B23K 26/702* (2015.10); *B23K 37/0408* (2013.01)

(58) Field of Classification Search
CPC .............. B23K 37/0408; B23K 26/034; B23K 26/702; B23K 26/24
(Continued)

(56) References Cited

U.S. PATENT DOCUMENTS 2,814,719 A * 11/1957 Wilson ................... B23K 9/007
219/127
3,629,546 A * 12/1971 Fry ....................... B23K 26/382
219/121.84
(Continued)

FOREIGN PATENT DOCUMENTS

CN 102601528 A 7/2012
CN 103221174 A 7/2013
(Continued)

OTHER PUBLICATIONS

First Search Report for Chinese priority application No. 2019107724011, Nov. 17, 2020, 3 pages. [Not in English].
(Continued)

*Primary Examiner* — Jimmy Chou
(74) *Attorney, Agent, or Firm* — Womble Bond Dickinson (US) LLP

(57) ABSTRACT

A laser stitch welding device, comprising: a laser welding assembly (3) configured to release laser beams from a front surface onto plates (5) to be welded that are stacked; a pressing piece (2) for adjusting a spacing between the stacked plates; detecting assembly for detecting a welding parameter of the stacked plates from a back surface; and a controller (1) for adjusting in real time the pressing level of the pressing piece (2) and/or operation parameters of the laser welding assembly (3) based on the welding parameter detected by the detecting assembly. The laser stitch welding device is capable of detecting in real time welding parameters such as back surface temperature and thermal infrared image of welding seams (6) when welding the plates. A (Continued)

control system controls the pressing level of the pressing piece or the operation parameters of the laser welding assembly based on the welding parameters to adjust the welding in a timely manner, thus achieving adaptive and stable control of weld penetration. The present application further provides a welding method for the laser stitch welding device.

8 Claims, 2 Drawing Sheets

(51) Int. Cl.
    *B23K 26/70*           (2014.01)
    *B23K 37/04*           (2006.01)

(58) Field of Classification Search
    USPC ................................................... 219/121.64
    See application file for complete search history.

(56) References Cited

U.S. PATENT DOCUMENTS

| | | | | | |
|---|---|---|---|---|---|
| 3,881,084 | A | * | 4/1975 | Baardsen | B23K 15/0093 219/137 R |
| 4,376,883 | A | * | 3/1983 | Dao | B23K 11/06 219/109 |
| 4,684,779 | A | * | 8/1987 | Berlinger | B23K 26/1436 219/121.84 |
| 4,745,257 | A | * | 5/1988 | Rito | B23K 26/037 219/121.64 |
| 4,866,242 | A | * | 9/1989 | Martyr | B23K 26/24 219/121.72 |
| 5,104,032 | A | * | 4/1992 | Spies | B23K 26/244 228/173.6 |
| 5,502,292 | A | * | 3/1996 | Pernicka | B23K 26/244 219/121.64 |
| 5,595,670 | A | * | 1/1997 | Mombo-Caristan | B23K 26/06 219/121.64 |
| 5,603,853 | A | * | 2/1997 | Mombo-Caristan | B23K 26/1437 219/121.64 |
| 5,789,718 | A | * | 8/1998 | Fukushima | B23K 11/061 219/83 |
| 5,841,097 | A | * | 11/1998 | Esaka | B23K 26/067 219/121.64 |
| RE36,612 | E | * | 3/2000 | Fukushima | B23K 11/115 219/83 |
| 6,252,197 | B1 | * | 6/2001 | Hoekstra | B23K 26/53 219/121.72 |
| 6,380,509 | B1 | * | 4/2002 | Arlt | B23K 26/28 219/121.78 |
| 6,710,283 | B2 | * | 3/2004 | Mori | B23K 31/125 219/121.64 |
| 6,906,281 | B2 | * | 6/2005 | Musselman | B23K 9/167 219/137 WM |
| 7,385,157 | B2 | * | 6/2008 | Oda | B23K 26/24 219/121.64 |
| 7,510,620 | B2 | * | 3/2009 | Terada | B29C 65/1664 156/272.8 |
| 8,350,185 | B2 | * | 1/2013 | Lee | B23K 26/244 219/121.64 |
| 8,487,211 | B2 | * | 7/2013 | Sakurai | B23K 1/0056 219/121.64 |
| 8,607,457 | B2 | * | 12/2013 | Huemmer | F16K 27/10 29/515 |
| 9,006,605 | B2 | * | 4/2015 | Schneegans | B21D 39/021 219/121.63 |
| 9,114,477 | B2 | * | 8/2015 | Haschke | B23K 26/1464 |
| 2002/0038792 | A1 | * | 4/2002 | Terada | B23K 26/244 219/121.6 |
| 2002/0079295 | A1 | * | 6/2002 | Shikoda | B23K 26/244 219/121.78 |
| 2002/0142184 | A1 | * | 10/2002 | Mazumder | B23K 26/32 219/121.64 |
| 2002/0144984 | A1 | * | 10/2002 | Mori | B23K 26/244 219/121.64 |
| 2004/0118818 | A1 | * | 6/2004 | Oda | B23K 26/0853 219/121.64 |
| 2004/0173587 | A1 | * | 9/2004 | Musselman | B23K 26/348 219/137 R |
| 2006/0011592 | A1 | * | 1/2006 | Wang | B23K 26/034 219/121.64 |
| 2006/0096957 | A1 | * | 5/2006 | Pfiz | B23K 26/083 219/161 |
| 2006/0144509 | A1 | * | 7/2006 | Hofmann | B29C 66/8362 156/304.6 |
| 2006/0144826 | A1 | * | 7/2006 | Becker | B29C 65/16 219/121.64 |
| 2006/0175301 | A1 | * | 8/2006 | Rippl | B23K 26/082 219/121.63 |
| 2007/0221637 | A1 | * | 9/2007 | Schurmann | B23K 26/03 219/121.64 |
| 2008/0035615 | A1 | * | 2/2008 | Li | B23K 26/244 219/121.64 |
| 2008/0245777 | A1 | * | 10/2008 | Cremerius | B23K 26/282 219/121.64 |
| 2009/0283505 | A1 | * | 11/2009 | Naumovski | C10M 169/04 219/121.64 |
| 2009/0294277 | A1 | * | 12/2009 | Thomas | G01N 27/3272 204/192.1 |
| 2011/0139753 | A1 | * | 6/2011 | Lee | B23K 26/244 219/121.64 |
| 2012/0125899 | A1 | * | 5/2012 | Oh | B23K 26/032 219/121.64 |
| 2012/0211474 | A1 | * | 8/2012 | Hayashimoto | B23K 26/0665 219/121.64 |
| 2013/0087540 | A1 | * | 4/2013 | Gu | B23K 26/354 219/121.64 |
| 2013/0168365 | A1 | * | 7/2013 | Kaga | B23K 11/255 219/78.16 |
| 2015/0086807 | A1 | * | 3/2015 | Song | H01B 1/023 72/39 |
| 2015/0336221 | A1 | * | 11/2015 | Mc Kay | B23K 31/02 228/8 |
| 2016/0039045 | A1 | * | 2/2016 | Webster | B23K 26/0643 356/450 |
| 2017/0239892 | A1 | * | 8/2017 | Buller | B28B 17/0081 |
| 2019/0143412 | A1 | * | 5/2019 | Buller | B23K 15/0013 219/76.12 |
| 2022/0274201 | A1 | * | 9/2022 | Han | B23K 26/24 |

FOREIGN PATENT DOCUMENTS

| | | | | |
|---|---|---|---|---|
| CN | 104002044 | A | 8/2014 | |
| CN | 204818438 | U | 12/2015 | |
| CN | 105598562 | A | 5/2016 | |
| CN | 107030382 | A * | 8/2017 | .......... B23K 26/702 |
| CN | 107755881 | A * | 3/2018 | .......... H01M 50/528 |
| CN | 110576261 | A | 12/2019 | |
| EP | 1005944 | A2 | 6/2000 | |
| JP | 2004223557 | A | 8/2004 | |
| JP | 2008049365 | A | 3/2008 | |
| JP | 2009085477 | A | 4/2009 | |
| JP | 2010105015 | A | 5/2010 | |
| JP | 2013086180 | A * | 5/2013 | .......... B23K 26/032 |
| JP | 2013545615 | A | 12/2013 | |
| WO | WO-2004056524 | A1 * | 9/2014 | ............ B23K 26/22 |

OTHER PUBLICATIONS

First Office Action for Japanese priority application No. 2022-505276, Mar. 28, 2023, 4 pages. [Not in English].
International Search Report of the China National Intellectual Property Administration (ISA/CN) for PCT Application No. PCT/CN2020/097922, (Chinese and English translation) dated Sep. 27, 2020, 8 pages.

(56)            References Cited

OTHER PUBLICATIONS

The Written Opinion of the International Searching Authority for
PCT Application No. PCT/CN2020/097922 mailed Feb. 25, 2021,4
pages.

* cited by examiner

LASER STITCH WELDING DEVICE AND WELDING METHOD THEREFOR

CROSS-REFERENCE TO RELATED APPLICATIONS

The present application is a US national phase application under 35 U.S.C. 371 of international application number PCT/CN2020/097922, filed Jun. 24, 2020, which claims priority to Chinese application No. 201910772401.1 filed on Aug. 21, 2019, entitled "Laser Stitch Welding Device and Welding Method Therefor", which was incorporated by reference in its entirety.

FIELD OF TECHNOLOGY

The present application relates to the technical field of welding, in particular to a laser stitch welding device and a welding method therefor.

BACKGROUND

Laser welding is widely used in various fields of industrial production by virtue of high energy density, large depth-to-width ratio of weld, small heat affected zone, excellent welding quality together with being well automated. Stitch welding, as an indispensable material connection method, also has an extensive range of applications in actual production.

With respect to stitch welding of two layers of medium thin plates, in general, a surface of the upper plate is welded when the two plates are stacked, the bottom has a certain degree of penetration but is not welded through. Advanced welding method usually uses laser welding. Nevertheless, difficulties in the control of welding penetration are inevitable during the welding process, namely the penetration in the bottom plate is either insufficient, or excessive or even burned through. In addition, the internal quality of the weld joint is difficult to be detected and traced.

SUMMARY

(I) Technical Problems to be Solved

An objective of the present application is to provide a penetration adaptive laser stitch welding device, as well as a welding method for a penetration adaptive laser stitch welding device, so as to at least solve the technical problem that the welding penetration is difficult to control in laser stitch welding.

(II) Technical Solutions

In order to solve at least the technical problem above, the present application provides a laser stitch welding device for welding at least two stacked plates to be welded, the device including:

a laser welding assembly for lasing stacked plates to be welded from a front surface;

a pressing piece for adjusting a spacing between the stacked plates;

a detecting assembly for detecting a welding parameter of the stacked plates from a back surface; and a controller for adjusting in real time a pressing level of the pressing piece and/or an operation parameter of the laser welding assembly based on the welding parameter detected by the detecting assembly.

In an embodiment, the welding parameter includes a temperature and/or a thermal image of a weld joint.

In an embodiment, the detecting assembly includes a temperature sensor and/or a thermal image sensor.

In an embodiment, the pressing piece includes a pressing roller.

The present application further provides a welding method of a laser stitch welding device, including:

lasing, by a laser welding assembly, stacked plates to be welded from a front surface;

detecting from a back surface, by a detecting assembly, a welding parameter of the stacked plates when being welded; and adjusting, by a controller, a pressing level of the pressing piece and/or an operation parameter of the laser welding assembly based on the welding parameter detected by the detecting assembly.

In an embodiment, the welding parameter includes a temperature and/or a thermal image of a weld joint.

In an embodiment, the adjusting, by a controller, a pressing level of the pressing piece and/or an operation parameter of the laser welding assembly based on the welding parameter detected by the detecting assembly includes:

when it is determined that the temperature detected is lower than a temperature standard value, and/or, the thermal image of the weld joint is less than a standard value of high-temperature area, the adjusting, by the controller, the pressing level of the pressing piece includes: increasing the pressure of the pressing piece to reduce the spacing between two adjacent plates to be welded.

In an embodiment, when it is determined that the temperature detected is lower than the temperature standard value, and/or, the thermal image of the weld joint is less than the standard value of high-temperature area, the adjusting, by the controller, the operation parameters of the laser welding assembly includes: increasing laser energy of the laser welding assembly, and/or reducing defocusing amount of a laser spot, and/or using a continuous laser output mode.

In an embodiment, the adjusting, by a controller, a pressing level of the pressing piece and/or operation parameters of the laser welding assembly based on the welding parameters detected by the detecting assembly includes:

when it is determined that the temperature detected is higher than the temperature standard value, and/or, the thermal image of the weld joint is greater than the standard value of high-temperature area, the adjusting, by the controller, the operation parameters of the laser welding assembly includes: reducing laser energy of the laser welding assembly, and/or increasing defocusing amount of laser spots, and/or using a pulsed laser output mode.

In an embodiment, when it is determined that the temperature detected is higher than the temperature standard value, and/or, the thermal image of the weld joint is greater than the standard value of a high-temperature area, the adjusting, by the controller, the pressing level of the pressing piece includes: reducing pressure of the pressing piece to increase the spacing between two adjacent plates to be welded.

(III) Beneficial Effects

The penetration adaptive laser stitch welding device provided by the present application includes: a laser welding assembly for lasing stacked plates to be welded from a front surface; a pressing piece for adjusting a spacing between the stacked plates; a detecting assembly for detecting a welding parameter of the stacked plates from a back surface; and a controller for adjusting in real time the pressing level of the pressing piece and/or an operation parameter of the laser welding assembly based on the welding parameters detected by the detecting assembly. During welding, the laser welding assembly lases, from the front surface, the stacked plates to be welded; the detecting assembly is used for detecting a welding parameter of the stacked plates from the back surface; and the controller adjusts the pressing level of the pressing piece and/or an operation parameter of the laser welding assembly based on the welding parameter detected by the detecting assembly. In view of the difficulties regarding penetration monitoring and control during the stitch welding of two layers of medium thin plate, in the present application, by means of a detecting assembly such as the temperature sensitive sensor and the thermal image sensor, the welding parameter (such as the temperature on the back surface and transmission of thermal infrared images of the weld joint) of the plates when being welded are detected in real time from the back surface weld joint. The temperature profiles and thermal images are recorded in real time in a control system, and the welding process is adjusted in a timely manner by controlling the pressing level of the pressing piece or the operation parameters of the laser welding assembly based on the welding parameters, thus achieving adaptive and stable control of the weld penetration. The penetration of the weld joint after welding may be analyzed and traced by calling the recorded temperature profiles and thermal images in the control system, so as to achieve online control of welding quality and traceability of post-weld quality, which greatly enhances the stability of stitch welding quality of two layers of the medium thin plates.

Figure 1:
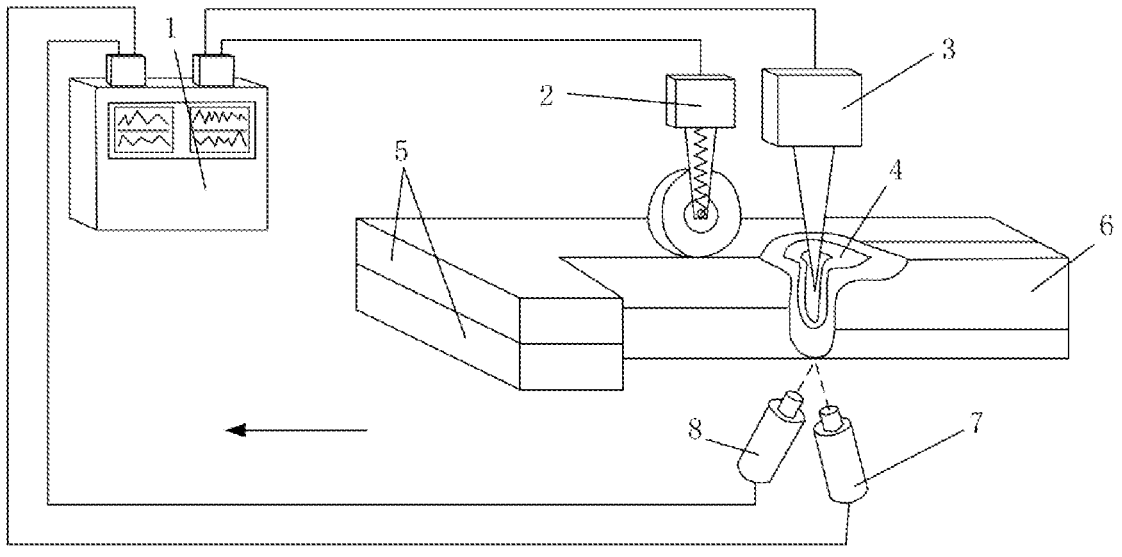
FIG. 1 is a schematic diagram showing a structure of a penetration adaptive laser stitch welding device according to an embodiment of the present application.

| Reference numerals: | |
| --- | --- |
| 1 controller | 2 pressing piece |
| 3 laser welding assembly | 4 weld pool |
| 5 plate to be welded | 6 weld joint |
| 7 thermal image sensor | 8 temperature sensor |

DETAILED DESCRIPTION

Specific implementations of the present application will be described in further detail below in conjunction with accompanying drawings and embodiments. The following embodiments are used to illustrate the present application, but are not intended to limit the scope of the present application.

With respect to the description of the present application, it should be noted that the orientation or positional relationship indicated by the terms such as "center", "longitudinal", "lateral", "length", "width", "thickness", "upper", "lower", "front", "back", "left", "right", "vertical", "horizontal", "top", "bottom", "inner", "outer", "clockwise", "counterclockwise", "axial", "radial" and "circumferential" is based on the orientation or positional relationship shown in the drawings, the purpose of which is only to facilitate describing the embodiments of present application and simplify the description, rather than to indicate or imply that the device or element referred to must have a specific orientation, be constructed and operated in a specific orientation, and therefore cannot be construed as a limitation of the present application.

In addition, terms "first", "second" and the like are for descriptive purpose only, and cannot be understood as indicating or implying the relative importance or implicitly specifying the number of technical features indicated. Hence, the features defined with "first", "second" and the like may explicitly or implicitly include at least one of the features. In the description of the present application, "a plurality of" means at least two, such as two and three, unless otherwise specifically defined.

With respect to the description of the present application, it should be noted that, unless otherwise clearly specified or defined, the terms "install", "connect with", "connect to" and "fix" should be understood in a broad sense, for instance, it can be a fixed connection or a detachable connection, or an integral connection; it can be mechanically connected, or electrically connected or communicable with each other; it can be directly connected or indirectly connected through an intermediary; it can be an internal communication between two elements or an interaction between two elements. For those of ordinary skill in the art, the specific meaning of the above terms in the present application can be understood according to the specific situations.

As shown in FIG. 1, the present application provides a penetration adaptive laser stitch welding device, including: a placement area for plates to be welded, a laser welding assembly 3, a pressing piece 2, a detecting assembly and a controller 1. The placement area for plates to be welded is used to place at least two stacked plates 5 to be welded, the laser welding assembly 3 is used to lase, from a front surface, the stacked plates 5 to be welded; the pressing piece 2 is used to press the stacked plates 5 to be welded in the placement area, and adjust a spacing between the stacked plates 5 to be welded; the detecting assembly is used for detecting a welding parameter of the stacked plates 5 from a back surface; and the controller 1 is used for adjusting in real time a pressing level of the pressing piece 2 and/or an operation parameter of the laser welding assembly 3 based on the welding parameter detected by the detecting assembly.

In an embodiment, the penetration adaptive laser stitch welding device is provided with a main structure, in which the placement area for plates to be welded is provided for placing the stacked plates 5 to be welded. For ease of description, the stacked plates 5 to be welded are treated as an integral structure, with a welding surface of the plates 5 to be welded being a front surface and a surface opposite to the welding surface being a back surface of the plates 5 to be welded. When laser stitch welding is being performed, the stacked plates 5 to be welded, which include at least two plates, are stacked in the placement area. The laser beams are emitted from the laser welding assembly 3 to the front surface, such that a weld pool 4 is formed on upper layer of the plate 5 to be welded, and the laser passes through only part of the thickness of the last layer of the plates 5 to be welded.

It should be noted that in some embodiments, the laser stitch welding device does not need to be provided with a separate placement area; instead, the traditional environment or the structure for placing the stacked plates to be welded may be utilized, the laser beams can be emitted directly from the front surface, the welding parameter can be detected from the back surface, and the penetration is thereupon adaptively adjusted based on the welding parameter.

The stacked plates 5 to be welded may be placed in the manner of a top surface being the front surface while a bottom surface being the back surface, and may also be placed vertically or obliquely according to the actual environment, alternatively, in the manner of a bottom surface being the front surface while a top surface being the back surface.

The following is an illustration of the manner of top surface being the front surface while the bottom surface being the back surface. The pressing piece 2 applies a pressing force on the upper plate to be welded to reduce the spacing between the stacked plates 5 to be welded. The pressing piece 2 moves with the welding position, and the pressing force of the pressing piece 2 is adjustable according to the control signal of the controller 1. In an embodiment, the pressing piece 2 is a pressing roller. The pressing piece 2 is provided with a pressing block, and a roller is arranged at the bottom thereof. The gravity of the pressing block is applied to the roller, which applies a pressing force to the plates 5 to be welded and rolls with the movement of the welding position to drive the pressing piece 2 to be in front of the welding position. In another embodiment, other forms such as sliding rather than rolling pressing structures may also be used.

The detecting assembly is used for detecting an influence parameter of the welding at the welding position on the plates 5 to be welded, namely a welding parameter, so as to determine whether the welding meets requirements, such as a required value and a standard value. When the welding is determined to be inconsistent with the required value or standard value, the controller 1 changes the pressing level of the pressing piece 2 and adjusts the operation parameter of the laser welding assembly 3, such as optical power, defocusing amount, output mode, thereby adaptively and stably controlling the penetration of weld joint 6.

In an embodiment, the welding parameter may include the temperature and/or thermal image of the weld joint 6 at a position on the back surface which is exactly opposite to the welding position of the stacked plates 5 to be welded. The position exactly opposite to the welding position is a preferred position, in that the temperature value and thermal images as well as the heat transfer speed and transfer volume may be acquired more accurately at the position. Undoubtedly, a position on the back surface which is not exactly opposite to the welding position also belongs to the protection scope of the present application.

In an embodiment, in order to acquire these welding parameters, a temperature sensor 8 is used to acquire the temperature values, and a thermal image sensor 7 is used to acquire the thermal images. Based on the acquired temperature values, a temperature profile is generated by the controller 1, and a diameter measurement line of the high temperature area is determined based on the acquired thermal images. A temperature standard line and a diameter standard line in a high temperature area are stored in the controller 1 for comparison.

The controller 1 adjusting the pressing level of the pressing piece 2 and the operation parameters of the laser welding assembly 3 based on the welding parameters detected by the detecting assembly, includes the following steps.

Figure 2:
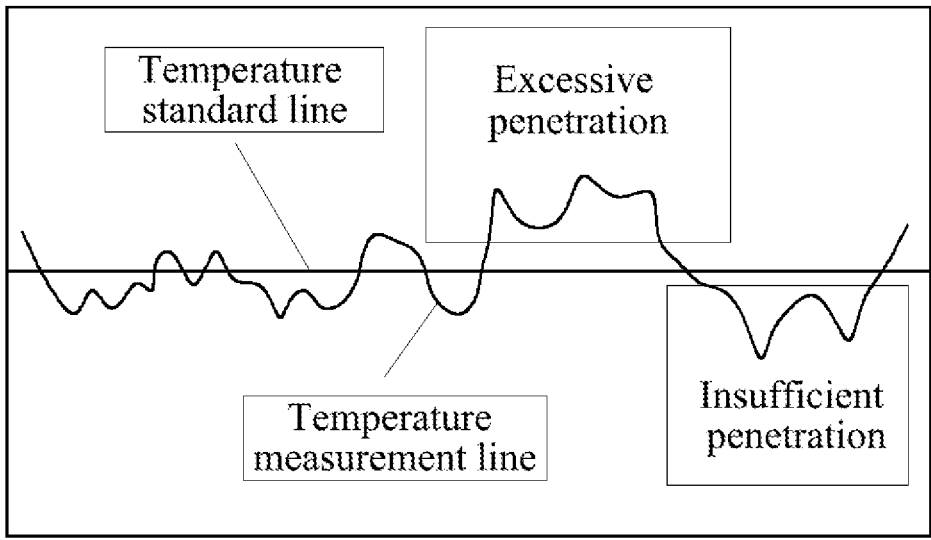
FIG. 2 is a schematic diagram showing determination of penetration by a penetration adaptive laser stitch welding device based on temperature value during welding process according to an embodiment of the present application.
Figure 3:
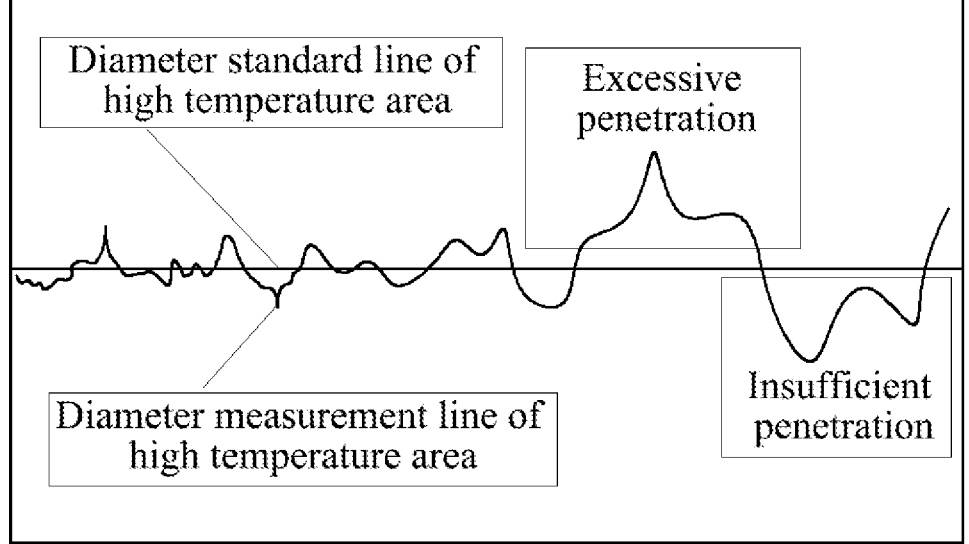
FIG. 3 is a schematic diagram showing determination of penetration by a penetration adaptive laser stitch welding device based on diameter of thermal image during welding process according to an embodiment of the present application.

As shown in FIGS. 2 and 3, when it is determined that the temperature at the position on the back surface of the stacked plates 5 to be welded which is exactly opposite to the weld joint 6 is lower than the temperature standard value, and/or, the high temperature area of the thermal image on the back surface of the stacked plates 5 to be welded is smaller than the standard value of the high temperature area, then:

in an embodiment, a first manner is adopted, namely, the controller 1 adjusts the pressing level of the pressing piece 2 to increase the pressure of the pressing piece 2 and reduce the spacing between two adjacent plates 5 to be welded;

in another embodiment, a second manner is adopted, namely, the controller 1 adjusts the operation parameters of the laser welding assembly 3 to increase the laser energy of the laser welding assembly 3, and/or reduce the defocusing amount of the laser spot, and/or use the continuous laser output mode.

In yet another embodiment, a combination of the first method and the second method can be adopted.

As shown in FIGS. 2 and 3, when it is determined that the temperature at the position on the back surface of the stacked plates 5 to be welded which is exactly opposite to the weld joint 6 is higher than the temperature standard value, and/or, the high temperature area of the thermal image on the back surface of the stacked plates 5 to be welded is greater than the standard value of the high temperature area, then:

in an embodiment, a third manner is adopted, namely, the controller 1 adjusts the operation parameters of the laser welding assembly 3 to reduce the laser energy of the laser welding assembly 3, and/or increase the defocusing amount of the laser spot, and/or use the pulsed laser output mode;

in another embodiment, a fourth manner is adopted, namely, the controller 1 adjusts the pressing level of the pressing piece 2 to reduce the pressure of the pressing piece 2 and increase the spacing between two adjacent plates 5 to be welded.

In yet another embodiment, a combination of the third method and the fourth method can be adopted.

In view of the difficulties regarding penetration monitoring and control during the stitch welding of medium thin double-layer plates, by providing a detecting assembly on the back surface opposite to the placement area for plates to be welded, such as the temperature sensitive sensor 8 and the thermal image sensor 7, the welding parameters of the plates 5 to be welded are detected in real time from the back surface, such as the temperature on the back surface and transmission of thermal infrared images of the weld joint 6. The temperature profiles and thermal images are recorded in real time in a control system, and the welding process is adjusted in a timely manner by controlling the pressing level of the pressing piece 2 or the operation parameters of the laser welding assembly 3 based on the welding parameters, thus achieving adaptive and stable control of penetration of the weld joint 6. The penetration of the weld joint 6 after welding may be analyzed and traced by calling the recorded temperature profiles and thermal images in the control system, so as to achieve online control of welding quality and traceability of post-weld quality, which greatly enhances the stability of stitch welding quality of the medium thin double-layer plates.

In addition, as shown in FIG. 1, the present application provides a welding method of a penetration adaptive laser stitch welding device, including:

step 110, lasing, by a laser welding assembly 3, stacked plates 5 to be welded from a front surface;

step 112, detecting from a back surface, by a detecting assembly, a welding parameter of the stacked plates when being welded; and step 114, adjusting, by a controller 1, a pressing level of the pressing piece 2 and/or an operation parameter of the laser welding assembly 3 based on the welding parameter detected by the detecting assembly.

After the plates 5 to be welded are placed in a stacked manner in the placement area for plates to be welded, the laser welding assembly 3 emits at a set value the laser from the front surface to the plates 5 to be welded. Subsequently, the detecting assembly starts to detect the welding parameter of the bottom plate from the back surface, such as the temperature value and thermal image, determines the temperature value and thermal image of the high temperature area (i.e., the area exactly opposite to the welding position), and determines the diameter of the thermal image of the high temperature area based on the thermal image of the high temperature area. The controller 1 establishes points for each temperature value and the diameter of the thermal image in the high temperature area, and connects them, compares the value at the point with the standard temperature line and the diameter standard line, and determines whether the depth of penetration is excessive or insufficient, and then adjusts the pressing level and the operation parameters of the laser welding assembly 3 according to the determined result to facilitate the control of the penetration and perform adaptive adjustments according to the penetration in real-time. Later, it is also possible to perform post-stage verification, comparison and analysis based on the temperature line and diameter measurement line formed by the controller 1.

It should be noted that when comparing with the temperature standard line and the thermal image diameter standard line respectively, the order of the comparing may be chosen freely, either one of standard lines may be compared or both of them may be compared separately to improve the accuracy of determination.

Multiple embodiments are given as follows.

Embodiment 1

As shown in FIG. 1, medium thin plates (i.e., the plates 5 to be welded) were stacked, a laser welding gun head (belonging to the laser welding assembly 3) was used for welding on the upper part of the medium thin plates, and the temperature (sensitive) sensor 8 and thermal image sensor 7 were disposed on the back surface of the bottom layer of the medium thin plates. The back surface temperature was measured by the temperature (sensitive) sensor in real time, and the thermal infrared image of the weld joint 6 was captured in real time by the thermal image sensor 7, and the temperature value and the thermal infrared image of the weld joint 6 a were transmitted to the control system including the controller 1. The temperature profile and thermal image were recorded in the control system in real time, and were compared with the temperature standard line and the thermal image diameter standard line, respectively.

As shown in FIGS. 2 and 3, when the penetration is insufficient, the heat transferred to the back surface of the bottom layer of the plates 5 to be welded is low, the surface temperature is lower than the standard value, and the high temperature area of the thermal image is reduced (the diameter of the high temperature area is smaller than the diameter on the diameter standard line). At this moment, the pressing force of the pressing roller can be increased to increase the adhesion of the upper and lower plates in order to increase the welding penetration. In addition, the laser energy can be increased, the laser spot defocus amount can be reduced, and the continuous output mode can be used (the three can be adjusted simultaneously, or only one or two of the three can be adjusted), thereby increasing the welding penetration.

The penetration of the weld joint 6 after welding can be analyzed and traced using the temperature profile and the thermal image diameter measurement line in the control system, so as to enable the online control of welding quality and the traceability of quality after welding.

It should be noted that when the penetration was insufficient, whether the degree of adhesion between the plates 5 to be welded met the requirements is firstly considered. When performing adjustment, the degree of adhesion between the plates 5 to be welded is also firstly adjusted.

Embodiment 2

Embodiment 2 is intended to provide different control methods for respect comparison results in Embodiment 1.

The temperature profile and thermal image are recorded in the control system in real time, and compared with the temperature standard line and the thermal image diameter standard line.

As shown in FIGS. 2 and 3, when the penetration is excessive, the heat transferred to the back surface of the bottom layer of the plates 5 to be welded is high, the surface temperature is higher than the standard value, and the high temperature area of the thermal image is increased (the diameter of the high temperature area is larger than the diameter on the diameter standard line). At this moment, the laser energy can be reduced, the laser spot defocus amount can be increased, and the pulsed output mode can be used (the three can be adjusted simultaneously, or only one or two of the three can be adjusted), thereby reducing the welding penetration. In addition, in some cases, the pressing force of the pressing roller can be reduced in some degree to reduce the degree of adhesion of the upper and lower plates in order to control the welding penetration.

In view of the difficulties regarding penetration monitoring and control during the stitch welding of two layers of medium thin plate (i.e., the double-layer plates to be welded), in the present application, by providing a temperature sensitive sensor and a thermal image sensor on or close to the back surface of the bottom layer of the plates to be welded, the back surface temperature and the thermal infrared image of the weld joint are transmitted to the control system in real time, and the temperature profile and thermal image are recorded in the control system in real time and compared with the standard value. If the welding process is abnormal, the control system will transmit signals to a welding control unit to adjust the welding process in time, thereby achieving the adaptive and stable control of the penetration. The penetration of the weld joint after welding may be analyzed and traced by calling the recorded temperature profiles and thermal images in the control system, so as to achieve online control of welding quality and traceability of quality after welding, which greatly improves the stability of laser stitch welding quality.

The above-mentioned are only preferred embodiments of the present application, which are not intended to limit the present application. Any modification, equivalent substitution, and improvement made within the principle of the present application shall be included in the protection scope of the present application.

What is claimed is:

1. A laser stitch welding device, comprising:

a laser welding assembly for lasing stacked plates to be welded from a front surface of the stacked plates;

a pressing piece for adjusting a spacing between the stacked plates;

a detecting assembly for detecting a welding parameter of the stacked plates from a back surface; and a controller for adjusting in real time a pressing level of the pressing piece and an operation parameter of the laser welding assembly based on the welding parameter detected by the detecting assembly;

wherein the welding parameter comprises a temperature and a thermal image of a weld joint;

in accordance with a determination that the temperature detected is lower than a temperature standard value, and/or, the thermal image of the weld joint is less than a standard value of a high temperature area, adjusting in real time the pressing level of the pressing piece comprises: increasing pressure of the pressing piece to reduce the spacing between two adjacent plates to be welded.

2. The device of claim 1, wherein the detecting assembly comprises a temperature sensor and a thermal image sensor.

3. The device of claim 1, wherein the pressing piece comprises a pressing roller.

4. The device of claim 2, wherein the pressing piece comprises a pressing roller.

5. A welding method for a laser stitch welding device, comprising:

lasing, by a laser welding assembly, stacked plates to be welded from a front surface of the stacked plates;

detecting from a back surface, by a detecting assembly, a welding parameter of the stacked plates when being welded; and adjusting in real time, by a controller, a pressing level of a pressing piece and an operation parameter of the laser welding assembly based on the welding parameter detected by the detecting assembly;

wherein the welding parameter comprises a temperature and a thermal image of a weld joint;

in accordance with a determination that the temperature detected is lower than a temperature standard value, and/or, the thermal image of the weld joint is less than a standard value of a high temperature area, adjusting in real time the pressing level of the pressing piece comprises: increasing pressure of the pressing piece to reduce the spacing between two adjacent plates to be welded.

6. The method of claim 5, wherein in accordance with a determination that the temperature detected is lower than the temperature standard value, and/or, the thermal image of the weld joint is less than the standard value of high-temperature area, the adjusting in real time, by the controller, the operation parameter of the laser welding assembly comprises: increasing laser energy of the laser welding assembly, and/or reducing defocusing amount of a laser spot, and/or using a continuous laser output mode.

7. The method of claim 5, wherein the adjusting in real time, by a controller, a pressing level of the pressing piece and an operation parameter of the laser welding assembly based on the welding parameter detected by the detecting assembly comprises:

in accordance with a determination that the temperature detected is higher than a temperature standard value, and/or, the thermal image of the weld joint is greater than a standard value of a high temperature area, the adjusting in real time, by the controller, the operation parameter of the laser welding assembly comprises: reducing laser energy of the laser welding assembly, and/or increasing defocusing amount of a laser spot, and/or using a pulsed laser output mode.

8. The method of claim 7, wherein in accordance with a determination that the temperature detected is higher than the temperature standard value, and/or, the thermal image of the weld joint is greater than the standard value of high-temperature area, the adjusting in real time, by the controller, the pressing level of the pressing piece comprises: reducing pressure of the pressing piece to increase the spacing between two adjacent plates to be welded.

* * * * *